United States Patent
Lenz et al.

(10) Patent No.: US 9,337,503 B2
(45) Date of Patent: May 10, 2016

(54) FUEL CELL POWER CONTROL BY OFFSET ESTIMATION

(71) Applicant: GM GLOBAL TECHNOLOGY OPERATIONS LLC, Detroit, MI (US)

(72) Inventors: Jochen Lenz, Hattersheim (DE); Andreas Voigt, Neu-Isenburg (DE); Jochen Schaffnit, Darmstadt (DE); Sebastian Lienkamp, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 13/794,216

(22) Filed: Mar. 11, 2013

(65) Prior Publication Data

US 2014/0255810 A1    Sep. 11, 2014

(51) Int. Cl.
*H01M 8/04* (2016.01)
*B60L 11/18* (2006.01)

(52) U.S. Cl.
CPC ......... *H01M 8/0494* (2013.01); *B60L 11/1883* (2013.01); *H01M 8/04619* (2013.01); *H01M 2250/20* (2013.01); *Y02E 60/50* (2013.01); *Y02T 10/7005* (2013.01)

(58) Field of Classification Search
CPC .......... H01M 8/0424; H01M 8/04925; H01M 8/04932
USPC .................................................. 429/429–432
See application file for complete search history.

(56) References Cited

U.S. PATENT DOCUMENTS

| | | | | |
|---|---|---|---|---|
| 4,335,337 A | * | 6/1982 | Okamatsu et al. | 318/52 |
| 2006/0263658 A1 | * | 11/2006 | Yanagi et al. | 429/22 |
| 2007/0013382 A1 | * | 1/2007 | Hinz et al. | 324/500 |
| 2007/0141416 A1 | * | 6/2007 | Kilian et al. | 429/23 |
| 2007/0178336 A1 | * | 8/2007 | Xu et al. | 429/13 |

* cited by examiner

*Primary Examiner* — James Lee
(74) *Attorney, Agent, or Firm* — John A. Miller; Miller IP Group, PLC

(57) ABSTRACT

A system and method for managing power flow in a fuel cell vehicle. The method provides a difference between a power limit signal and an actual power signal to a PI controller to generate a power offset signal. The method determines whether a fuel cell stack is able to provide enough power to satisfy a power request, and if so, adds the power request and the power offset signal to generate a stack power request signal to cause the upper power limit signal to move towards and be matched to the actual power signal. If the stack is not able to provide enough power to satisfy the load power request signal, the method subtracts the power offset signal from the power limit signal to provide a load limit signal to cause the actual stack power signal to move towards and be matched to the upper power limit signal.

20 Claims, 2 Drawing Sheets

FUEL CELL POWER CONTROL BY OFFSET ESTIMATION

BACKGROUND OF THE INVENTION

1. Field of the Invention

This invention relates generally to a system and method for managing power flow in a fuel cell vehicle that includes providing a power match between actual fuel cell stack power and a fuel cell stack power limit and, more particularly, to a system and method for managing power flow from a fuel cell stack to a controlled electric drive system, sometimes referred to herein as a power inverter module (TPIM), by estimating the unknown offset-power, which is the sum of power of any other load, such as ancillary loads, the distributed efficiency losses and some unmanaged electric loads, for example, heaters, fans, etc., and that employs a single controller for both a power request signal-path and a power limit signal-path.

2. Discussion of the Related Art

Electric vehicles, such as battery electric vehicles (BEV), extended range electric vehicles (EREV), and electric hybrid vehicles that combine a battery and a main power source, such as an internal combustion engine, fuel cell system, etc., exist in the art. Most fuel cell vehicles are hybrid vehicles that employ a rechargeable supplemental high voltage power source in addition to the fuel cell stack, such as a DC battery or an ultracapacitor. The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. The fuel cell stack is used to recharge the battery at those times when the fuel cell stack is able to meet the system power demand. The generator power available from the traction motor can provide regenerative braking that can also be used to recharge the battery through the DC bus line.

A typical fuel cell stack for a vehicle may have two hundred or more stacked fuel cells. The fuel cell stack receives a cathode side input gas including oxygen, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. The fuel cell stack includes a series of bipolar plates positioned between the several membrane electrode assemblies (MEAs) in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The propulsion power for operating a vehicle typically is very dynamic. When using a fuel cell stack to supply the vehicle propulsion power, the power provided by the stack is required to follow the dynamic power request from the vehicle driver as provided by the vehicle acceleration pedal. The hydrogen fuel and air (media) are provided to the stack at a certain pressure and flow rate so that when the fuel cell system receives a power request signal, the system controls various devices and components that supply the media to the stack, monitors the stack operating conditions, and provides a power signal that identifies the power provided by the stack. However, there is a limit to the dynamic response of the fuel cell system in that the system cannot follow relatively fast power request transients. In the case of such a transient power request for a vehicle motoring mode, the available power will be provided by the fuel cell stack and the power drawn by the vehicle loads will be required to follow the reduced transient dynamic of the stack power. The physical power flow in the system is actuated by the system loads, usually the vehicle propulsion motor, not by the fuel cell system. However, the set point for the power is either driven by the loads (normal mode), or by the fuel cell system (limited mode).

To prevent damage to the fuel cell stack as a result of a voltage overload, the power drawn by vehicle loads must not exceed an upper power limit provided by the fuel cell stack control. Also, the power drawn from the stack should not fall below the upper power limit for a significant period of time because under-loading the stack could lead to long-term stack degradation. Particularly, if the system devices provide more air and hydrogen than is required for the actual power demand, inappropriate operating conditions of the stack could result, which could lead to long-term degradation as a result of the stack drying out.

As mentioned, the actual stack power during the motoring mode should be maintained as close as possible to the upper power limit. Short-term power deviations are generally acceptable if they are below a certain peak power limit, but it is generally not acceptable if there is a continuous deviation of stack power beyond the upper power limit or that the stack power falls below the lower power limit. If there is a continuous deviation of the stack power from the upper power limit, the system controller must take remedial action. There are two ways to accomplish this control, namely, employ a request power mode where the power consumption from the stack is maintained, and the stack power capability is adjusted by controlling the request signal, or employ a power limit mode where the stack power limit is given by stack operation conditions, and the actual power drawn from the stack is adjusted by controlling the TPIM. If the stack is able to provide the requested power, then the power request mode will be used and the stack power will follow the power request. This means that the power request from the load is controlled in such a manner that the stack power limit matches the actual stack power. If the stack is not able to provide the requested power, then the power limit mode is used and the actual stack power will be maintained at the power limit. This means that the power to the loads is controlled in such a manner that the actual stack power matches the stack power limit all the time. During normal operating conditions, the power request mode is used where the driver sets the stack power by actuating the acceleration pedal, and the power limit is controlled so that it matches the actual power.

The system could also be operated in a regenerative braking (regen) mode where energy from regenerative braking of the vehicle is used to recharge the battery and to supply power to the loads, which saves energy provided by the fuel cell stack and increases the overall system efficiency. In this case, a lower power limit is needed to make sure the stack power does not become negative, where the lower power limit is used for the system control in the same manner as the upper power limit control. The discussion above for the power request mode and the power limit mode described above is only for the motoring mode, and does not consider the regen mode. In the regen mode, the stack power is matched to the lower power limit.

In current fuel cell systems, a separate proportional-integral (PI) controller is used for the power request mode and the power limit mode to match the stack power limit and the actual stack power for the power request and power limit mode. Further, it is necessary to consider the unknown power consumption of the uncontrolled vehicle loads. These loads are not visible to the control system and they are not included in the load control signals, but there power consumption is part of the overall actual stack power. State of the art systems typically measure or estimate how much power each of the auxiliary uncontrolled loads is drawing, and adds those power levels together to get the total power being used. However, it has been difficult to determine how much power is required by the various uncontrolled loads to provide the desired match between the power provided and the power consumed.

SUMMARY OF THE INVENTION

In accordance with the teachings of the present invention, a system and method are disclosed for managing power flow in a fuel cell vehicle. The fuel cell system includes a fuel cell stack and controlled and uncontrolled system loads. The method provides power from the fuel cell stack on a power bus to provide power to the system loads and measures the power on the power bus to provide an actual power signal. The method further provides a difference between a power limit signal and the actual power signal to a PI controller to generate a power offset signal. The method determines whether the fuel cell stack is able to provide enough power to satisfy a load power request signal, and if so, adds the loads power request signal and the power offset signal to generate a stack power request signal to cause the power limit signal to move towards and be matched to the actual power signal. If the fuel cell stack is not able to provide enough power to satisfy the load power request signal, the method subtracts the power offset signal from the stack power limit signal to provide a load power limit signal to cause the actual stack power signal to move towards and be matched to the power limit signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for managing power control in a fuel cell vehicle is merely exemplary in nature, and is in no way intended to limit the invention or its applications or uses.

The present invention proposes a control architecture for managing power control in a fuel cell vehicle that matches the power provided by a fuel cell stack to the power consumed by the loads receiving power from the fuel cell stack in the vehicle. The control architecture includes a single PI controller that provides power control for both a power request mode and a power limit mode, where the control switches inherently (without explicit moding) between the two modes depending on whether the stack is able to provide the requested power. For those times when the stack is not able to provide requested power, such as due to stack overheating, shortage of media supply, exceeding cell voltage limits, degradation of the stack, etc., the control switches to the power limit mode where the loads are limited in how much power they can draw from the stack. One point of novelty is that just one PI controller is needed to handle both the power request signal path and the power limit signal path, where the PI controller is enabled continuously, and is not mode-dependent, which increases system robustness. Further, only a single power sensor in hardware is required. By providing good, predictive estimations for the power consumption of the unmanaged loads (without need for hardware sensors), the overall dynamic of the system will be increased. It is easy to add additional loads just by adding power estimations to an offset summation point. An upper power limit and lower power limit are provided for the motoring mode and the regen mode, respectively. In order to handle both of the power limits it is necessary to switch between the motoring and regen modes, which results in the need for a switch block and logic for the switching strategy.

Figure 1:
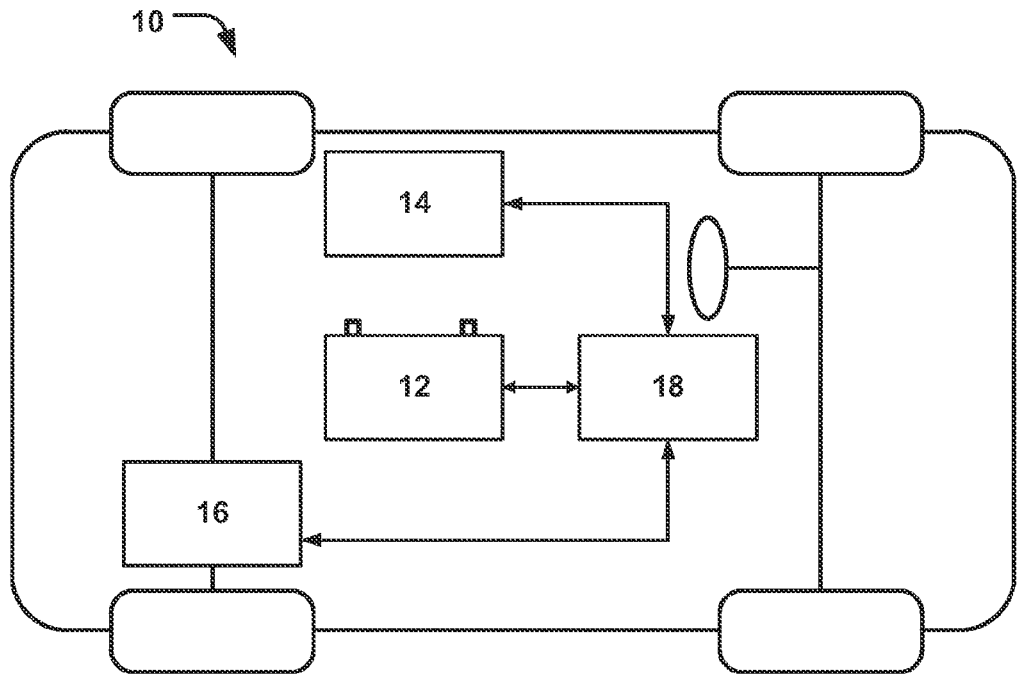
FIG. 1 is a simple block diagram of a vehicle power system.

FIG. 1 is a simplified plan view illustrating a hybrid electric vehicle 10 that includes a high-voltage battery 12, a fuel cell stack 14, a propulsion unit 16 and a DC/DC controller 18. The controller 18 represents all of the control modules and devices necessary for the operation and power flow control in the vehicle 10.

Figure 2:
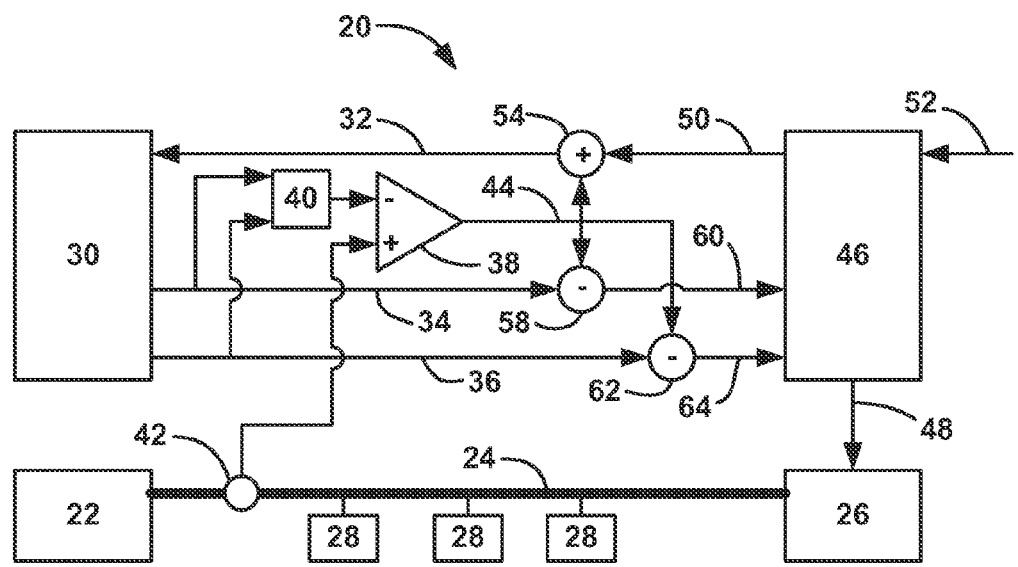
FIG. 2 is a schematic block diagram of a power control architecture for a fuel cell system.

FIG. 2 is a block diagram of a power control system 20 including a fuel cell stack 22. The fuel cell stack 22 provides stack power on a high voltage power bus 24 to the various loads that may be on the vehicle and require power, where the loads will include controlled loads whose power draw can be controlled and uncontrolled loads whose power draw is not controlled. The controlled loads in the system 20 would be the vehicle electric traction system (ETS) including propulsion motor, DC/DC power converter, vehicle battery, etc., all generally represented by box 26. A number of auxiliary uncontrolled loads, represented generally by boxes 28, such as the cathode air compressor, cabin heater, low volt (12V) supply DC/DC, etc., are also electrically coupled to the bus 24. The cathode air compressor is treated as an uncontrolled load because it receives it's commands from the internal controls of the fuel cell stack 22 and not from the described power management system. The system 20 includes a stack controller 30 that receives a stack power request signal $P_{req\_Stk}$ on line 32 that sets the desired output power of the stack 22 to meet the power demand of the loads 26 and 28. Based on the stack power request signal $P_{req\_Stk}$, the stack controller 30 provides an upper power limit signal $P_{lim\_upp}$ on line 34 for the motoring mode and a lower power limit signal $P_{lim\_low}$ on line 36 for the regen mode discussed in more detail below. The upper power limit signal $P_{lim\_upp}$ and the lower power limit signal $P_{lim\_low}$ are provided to a switch 40 that is set to a position depending on whether the vehicle 10 is in the motoring mode or the regen mode.

Depending on whether the vehicle 10 is in the motoring mode or the regen mode, either the upper power limit signal $P_{lim\_upp}$ or the lower power limit signal $P_{lim\_low}$ is provided to a negative input of a PI controller 38 through the switch 40, where the PI controller 38 could be part of the controller 18. A power sensor 42 measures the actual power drawn from by the stack 22 on the bus 24 and provides an actual power signal $P_{act}$ identifying the power being drawn from the fuel cell stack 22 to the positive input of the PI controller 38. The sensor 42 allows a single power measurement to be used to determine the actual power being drawn from the stack 22 instead of determining the individual power draw from each of the loads 28. The PI controller 38 uses the difference between the power limit signal $P_{lim}$ and the actual power signal $P_{act}$ to generate a power offset signal $P_{offs}$ on line 44, where the offset signal $P_{offs}$ represents the summation of the power drawn by the uncontrolled loads 28.

The system 20 also includes an electric drive system controller 46 that controls the amount of power the electric drive system in the load 26 can draw from the bus 24 using a torque command signal on line 48. The system 20 may also include a hybrid battery that is part of the power management as will be discussed below. The drive system controller 46 provides a load power request signal $P_{req\_load}$ on line 50 in response to a driver power request signal on line 52, which is provided to a summation junction 54. The summation junction 54 adds the load power request signal $P_{req\_load}$ to the offset signal $P_{offs}$ from the PI controller 38 to generate the stack power request signal $P_{req\_Stk}$ provided to the stack controller 30. The power offset signal $P_{offs}$ is subtracted from the upper power limit signal $P_{lim\_upp}$ by a subtractor 58 to generate a motoring mode power limit signal $P_{lim\_mot}$ that is provided to the drive system controller 46 on line 60. Likewise, the power offset signal $P_{offs}$ is subtracted from the lower power limit signal $P_{lim\_low}$ by a subtractor 62 to generate a regen mode power limit signal $P_{lim\_reg}$ that is applied to the electric drive system controller 46 on line 64.

As mentioned, the power offset signal $P_{offs}$ represents the summation of the power drawn from all of the loads 28 that are not controlled by the drive system controller 46. The PI controller 38 will eliminate any steady-state deviation in the power offset signal $P_{offs}$. However, the transient behavior can be optimized by predicting the power required by the uncontrolled loads 28 and adding this power to the load power request signal $P_{req\_load}$ from the controller 46, which improves the dynamic behavior for better system performance. In other words, the offset power prediction signal is an estimated prediction of the expected power consumption of all of the uncontrolled loads 28. This signal is only needed to improve the transient behavior of the system. The estimate of the power prediction signal should be as good as possible, but it does not need to be exact because the PI-controller 76 will eliminate any steady-state deviation. Optimizing this power prediction estimation for the best system dynamic behavior is a controls engineering task.

When the system 20 is in the motoring power request mode where the stack 22 is able to provide the requested power, the stack controller 30 uses the stack power request signal $P_{req\_Stk}$ to change the upper power limit signal $P_{lim\_upp}$ as the actual power signal $P_{act}$ changes in response to changes to the power drawn by the loads 26 and 28, which causes the offset power $P_{offs}$ to change. In other words, the stack controller 30 controls the stack power request signal $P_{req\_Stk}$ in such a way that the upper power limit signal $P_{lim\_upp}$ is matched to the actual stack power $P_{act}$. When the system 20 is in the motoring mode and the power limit mode where the stack 22 is not able to provide the requested power, the drive system controller 46 uses the motoring mode power limit signal $P_{lim\_mot}$ to reduce the power draw from the loads 26 on the control line 48 so that the actual stack power signal $P_{act}$ matches the upper power limit signal $P_{lim\_upp}$. In other words, the drive system controller 46 controls the loads 26 in such a way that the actual stack power $P_{act}$ is matched to the upper stack power limit $P_{lim\_upp}$. When the system 20 is in the regen mode, the drive system controller 46 controls the power drawn by the loads 26 so that the actual stack power signal $P_{act}$ is matched to the lower power limit signal $P_{lim\_low}$. In other words, the drive system controller 46 controls the power draw of the controlled loads 26 in such a way that the actual stack power $P_{act}$ moves towards and matches to the lower stack power limit $P_{lim\_low}$. When the system 20 is in the regen mode, the system 20 would not operate in the power request mode.

Figure 3:
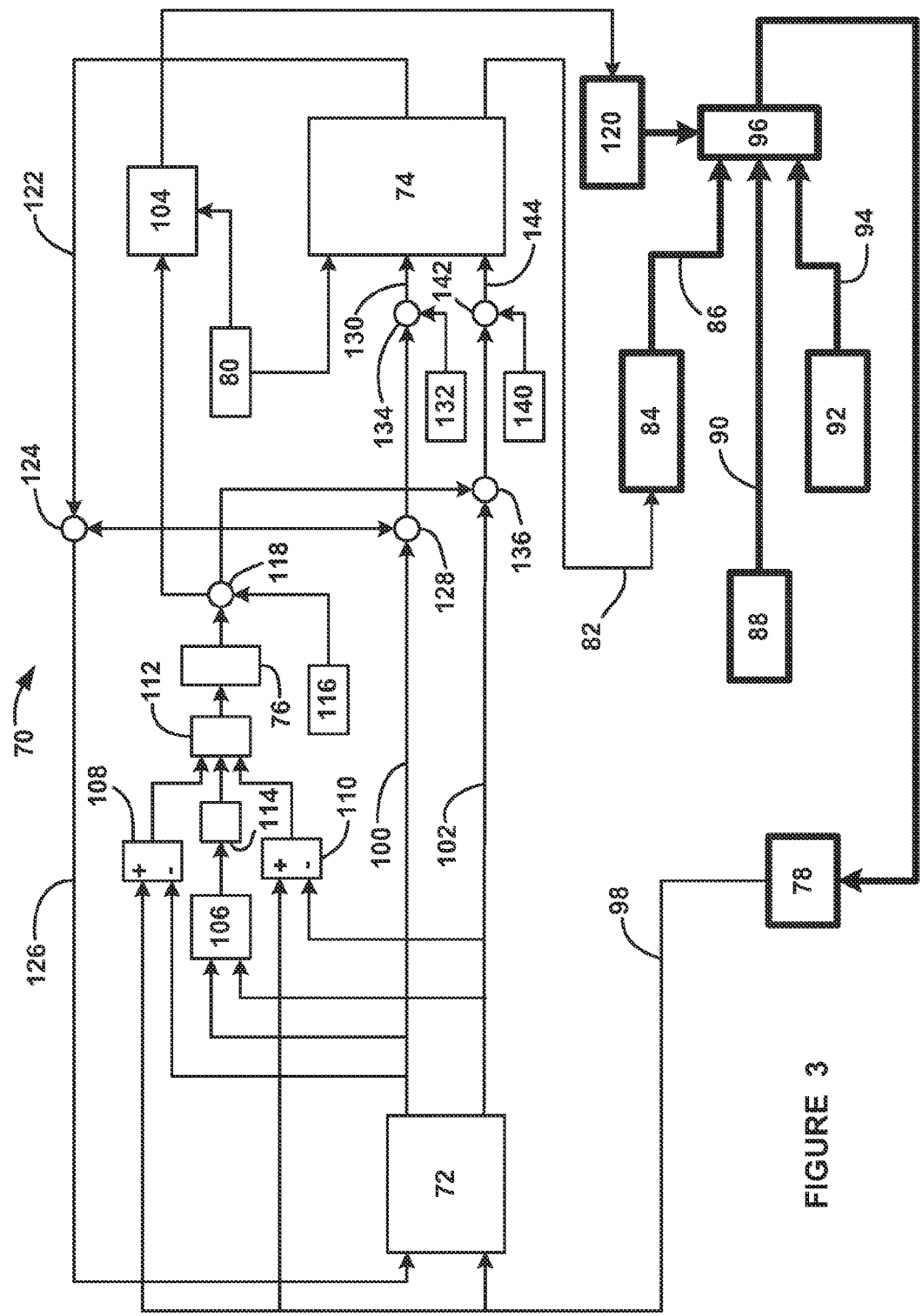
FIG. 3 is a detailed schematic block diagram of a fuel cell stack propulsion system.

FIG. 3 is a more detailed block diagram of a control architecture 70 for implementing the power request mode and the power limit mode as discussed above, including the integration of a hybrid battery and a DC/DC, and also shows the logic to switch between the motoring and regen mode using the switch 40. In the architecture 70, box 72 represents the stack controller 30, box 74 represents the drive system controller 46, box 76 represents the PI controller 38, but using error inputs instead of + and − inputs, and box 78 represents the power sensor 42.

The driver request signal is provided to the drive system controller 74 from box 80, representing the vehicle acceleration pedal position. The driver request signal is also provided to a DC/DC and battery control module 104 that employs a hybrid power strategy between the battery and the stack for power optimization. The control algorithms for providing the hybrid control and strategy for selecting the power mix between the battery and stack power is not within the scope of this invention. The controller 74 provides a torque command signal on line 82 that causes the propulsion system on the vehicle 10, represented at box 84, to draw a certain amount of power from the fuel cell stack 22 based on the driver request. The physical power drawn by the propulsion system 84 is provided on line 86 and adds to the power drawn by the system cathode compressor (uncontrolled load) represented by box 88 provided on line 90 and the power drawn by the other system uncontrolled loads, represented by box 92, provided on line 94 in a symbolic adder 96. Also, the power draw from the battery 12 or the power draw from the stack 22 being used to charge the battery 12 is provided to DC/DC and battery hardware 120 that is added (subtracted) in the adder 96. The total power being drawn from the stack 22 is provided on line 98 as the actual power signal $P_{act}$ and is sent to the stack controller 72.

The controller 72 provides the upper power limit signal $P_{lim\_upp}$ on line 100 for the motoring mode and the lower power limit signal $P_{lim\_low}$ on line 102 for the regen mode. When the vehicle 10 is not providing regenerative braking power, the upper power limit signal $P_{lim\_upp}$ is used and the control logic at the switch 114 switches between the power request mode and the power limit mode depending on whether the fuel cell stack 22 can supply the desired power at that particular point in time. When the architecture 70 is in the regen mode, the system would not be in the power request mode, but would be in the power limit mode and be using the lower power limit signal $P_{lim\_low}$. The architecture 70 includes a detector box 106 that detects whether the vehicle 10 is in the motoring mode or the regen mode based on the upper and lower power limit signals on the lines 100 and 102, respectively. An upper limit subtractor box 108 provides a difference between the actual stack power $P_{act}$ and the upper power limit signal $P_{lim\_upp}$ and a lower limit subtractor box 110 provides a difference between the actual stack power $P_{act}$ and the lower power limit signal $P_{lim\_low}$.

If the detector 106 detects that the vehicle 10 is in the motoring mode, it provides the upper power limit difference signal through a hysteresis box 114, which provides signal stability, to a switch 112 so that the PI controller 76 uses the difference signal from the subtractor 108. When the detector 106 detects that the vehicle 10 is in the regen mode it provides the lower power limit difference signal to the switch 112 so that the PI controller 76 uses the difference signal from the subtractor 110. The output signal of the PI controller 76 is added to an offset power prediction signal from box 116 in an adder 118 to generate the power offset signal $P_{offs}$, where the box 116 represents the predictive power estimation of all of the uncontrolled loads 28. If any or all of the uncontrolled loads, such as the cathode compressor, are able to provide good estimates of their power consumption, then those estimates of the power draw can be added from the box 116 to the output of the PI controller 76 to provide a more accurate power offset signal $P_{offs}$. In order to include the battery power (or the DC/DC power flow, resp.) into the power management, a good predictive estimation for the DC/DC power consumption (either pos or neg) provided by the controller 104 must be added to the offset power summation point in the adder 118.

The power offset signal $P_{offs}$ is added to the load power request signal $P_{req\_load}$ from the load controller 74 on line 122 in an adder 124 to generate the stack power request signal $P_{req\_Stk}$ on line 126 that is applied to the fuel cell stack controller 72. The power offset signal $P_{offs}$ is subtracted from the upper power limit signal $P_{lim\_upp}$ on the line 100 in a subtractor 128. The motoring mode power limit signal $P_{lim\_motor}$ from the subtractor 128 is sent to the controller 74 on line 130 after it is added to an upper margin signal at box 132 in an adder 134. The power offset signal $P_{offs}$ from the PI controller 76 is subtracted from the lower power limit signal $P_{lim\_low}$ on the line 102 in a subtractor 136. The difference between the power offset signal $P_{offs}$ and the lower limit power signal $P_{lim\_low}$ is added to a lower margin signal at box 140 in an adder 142 before being sent to the controller 74 as the regen mode power limit signal $P_{lim\_regen}$ on line 144. The upper margin signal and the lower margin signal allow a small dynamic limit overshoot, which is necessary to ramp up the compressor power during a transient, where the stack 22 can tolerate such a limit overshoot as long as it is limited in magnitude and time. If the vehicle 10 is in the motoring, power request mode, then the controller 74 disregards the motoring mode power limit signal $P_{lim\_motor}$ on the line 130 and if the vehicle 10 is in the motoring mode and the power limit mode, the controller 74 uses the motoring mode power limit signal $P_{lim\_motor}$ on the line 130. If the vehicle 10 is in the regen mode, then the controller 74 uses the regen mode power limit signal $P_{lim\_regen}$ on the line 144.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing power control in a fuel cell system, said fuel cell system including a fuel cell stack and controlled and uncontrolled system loads, said method comprising:
    providing power from the fuel cell stack on a power bus to power the system loads;
    measuring the power on the power bus to provide an actual stack power signal;
    providing a difference between an upper power limit signal and the actual power stack signal to a controller to generate a power offset signal;
    determining whether the fuel cell stack is able to provide enough power to satisfy a load power request signal;
    adding the load power request signal and the power offset signal to generate a stack power request signal and causing the upper power limit signal to move towards and be matched to the actual stack power signal if the fuel cell stack is able to provide enough power to satisfy the load power request signal; and
    subtracting the power offset signal and the upper power limit signal to provide a first power limit signal to limit the power draw of the controlled system loads so that the actual stack power signal moves towards and is matched to the upper power limit signal if the fuel cell stack is not able to provide enough power to satisfy the load power request signal.

2. The method according to claim 1 further comprising determining whether the fuel cell system is in a motoring mode or a regenerative braking mode, wherein matching the upper power limit signal to the actual stack power signal or matching the actual stack power signal to the upper power limit signal is performed if the system is in the motoring mode.

3. The method according to claim 2 further comprising subtracting the power offset signal and a lower power limit signal to provide a second power limit signal to limit the power draw of the controlled system loads so that the actual stack power signal moves toward and is matched to the lower power limit signal if the system is in the regenerative braking mode.

4. The method according to claim 1 further comprising providing an estimate of an expected power draw of one or more of the uncontrolled system loads to the power offset signal before adding the power request signal and the power offset signal or subtracting the power offset signal and the upper power limit signal.

5. The method according to claim 1 wherein measuring the power on the power bus includes using a single power sensor.

6. The method according to claim 1 wherein the controlled loads include a vehicle electrical traction system, a DC/DC converter and a battery.

7. The method according to claim 1 wherein the uncontrolled system loads include a compressor providing a flow of air to the fuel cell stack.

8. The method according to claim 1 wherein the power offset signal is the power drawn by all of the uncontrolled loads.

9. The method according to claim 1 wherein the controller is a proportional-integral (PI) controller.

10. The method according to claim 1 wherein the fuel cell system is on a vehicle.

11. A method for providing power control in a fuel cell system on a vehicle, said fuel cell system including a fuel cell stack and controlled and uncontrolled system loads, wherein the controlled loads include a vehicle electrical traction system, a DC/DC converter and a battery and the uncontrolled system loads include a compressor providing a flow of air to the fuel cell stack, said method comprising:
provideing power from the fuel cell stack on a power bus to power the system loads;
measuring the power on the power bus using a single power sensor to provide an actual stack power signal;
providing a difference between an upper power limit signal and the actual power stack signal to a proportional-integral (PI) controller to generate a power offset signal;
determining whether the fuel cell stack is able to provide enough power to satisfy a load power request signal;
adding the load power request signal and the power offset signal to generate a stack power request signal and causing the upper power limit signal to move towards and be matched to the actual stack power signal if the fuel cell stack is able to provide enough power to satisfy the load power request signal; and
subtracting the power offset signal and the upper power limit signal to provide a first power limit signal to limit the power draw of the controlled system loads so that the actual stack power signal moves towards and is matched to the upper power limit signal if the fuel cell stack is not able to provide enough power to satisfy the load power request signal.

12. The method according to claim 11 further comprising determining whether the fuel cell system is in a motoring mode or a regenerative braking mode, wherein matching the upper power limit signal to the actual stack power signal or matching the actual stack power signal to the upper power limit signal is performed if the system is in the motoring mode.

13. The method according to claim 12 further comprising subtracting the power offset signal and a lower power limit signal to provide a second power limit signal to limit the power draw of the controlled system loads so that the actual stack power signal moves toward and is matched to the lower power limit signal if the system is in the regenerative braking mode.

14. A system for providing power control in a fuel cell vehicle, said system comprising:
a fuel cell stack;
a power bus receiving power from the fuel cell stack;
a plurality of controlled loads electrically coupled to and receiving power from the power bus;
a plurality of uncontrolled loads electrically coupled to and receiving power from the power bus;
a sensor that measures power on the power bus and provides an actual stack power signal;
a fuel cell stack controller that is programmed to be responsive to a stack power request signal, said stack controller further programmed for generating an upper power limit signal in response to the stack power request signal;
a proportional-integral (PI) controller that is programmed to be responsive to a difference between the upper power limit signal and the actual stack power signal, said PI controller further programmed for generating a power offset signal;
a drive system controller that is programmed to be responsive to a driver power request signal and generating a load power request signal, said drive system controller further programmed for controlling the controlled loads;
an adder adding the load power request signal and the power offset signal to generate the stack power request signal; and
a first subtractor subtracting the upper power limit signal and the power offset signal to provide a first power limit signal, wherein the stack controller is programmed to cause the upper power limit signal to move towards and matched to the actual stack power signal if the fuel cell stack is able to provide enough power to satisfy the load power request signal, and wherein the load controller is programmed to control the controlled loads using the first power limit signal so that the actual stack power signal moves towards and is matched to the upper power limit signal if the fuel cell stack is not able to provide enough power to satisfy the load power request signal.

15. The system according to claim 14 wherein the stack controller also provides a lower power limit signal, said system further comprising a second subtractor subtracting the lower power limit signal and the power offset signal to provide a second power limit signal.

16. The system according to claim 15 further comprising a detector for detecting whether the vehicle is in a motoring mode or a regenerative braking mode, said load controller controlling the controlled loads using the first power limit signal if the vehicle is in the motoring mode and using the second power limit signal if the vehicle is in the regenerative braking mode.

17. The system according to claim 14 further comprising means for providing an offset power prediction signal that is an estimate of an expected power draw of one or more of the uncontrolled system loads to the power offset signal before the power request signal and the power offset signal are added or the power offset signal and the upper power limit signal are subtracted.

18. The system according to claim 14 wherein the controlled loads include a vehicle electrical traction system, a DC/DC converter and a battery.

19. The system according to claim 14 wherein the uncontrolled system loads include a compressor providing a flow of air to the fuel cell stack.

20. The system according to claim 14 wherein the power offset signal is the power drawn by all of the uncontrolled loads.

* * * * *